Figure 1:
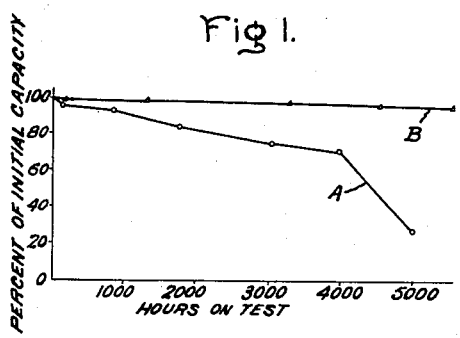
Figure 2:
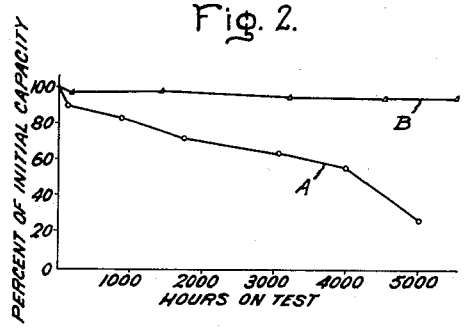
Figure 3:
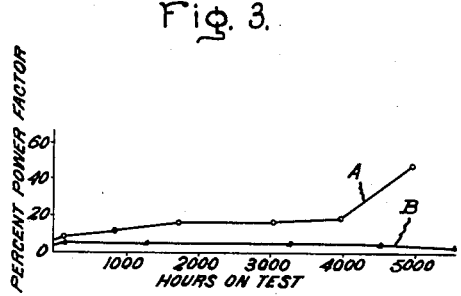
Figure 4:
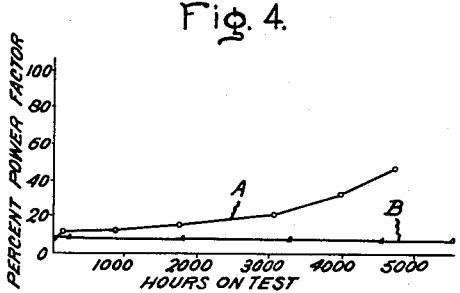

Inventors:
Ralph A. Ruscetta,
Alfred F. Torrisi,
by
Their Attorney

United States Patent Office 2,739,110
Patented Mar. 20, 1956

2,739,110

METHOD OF FORMING OXIDE FILMS ON ELECTRODES FOR ELECTROLYTIC CAPACITORS

Ralph A. Ruscetta and Alfred F. Torrisi, Pittsfield, Mass., assignors to General Electric Company, a corporation of New York Application October 27, 1951, Serial No. 253,492

6 Claims. (Cl. 204—56)

The present invention relates to a method of forming films on filming-metal electrodes for electrolytic capacitors. It is more specifically concerned with a method of electrolytically forming dielectric films on tantalum electrodes. One object of the present invention is the provision of an improved method of forming on a tantalum foil electrode a dielectric film having superior dielectric characteristics particularly at temperatures well above room temperature.

Another object of the invention is to provide an improved method of forming dielectric films on tantalum electrodes of such a character that a capacitor containing these electrodes possesses a stable capacity and a stable low energy loss at room and elevated temperatures.

A further object of the invention is to provide an improved high temperature process of forming a dielectric film of increased capacitance per unit area by employing a high boiling electrolyte and a forming voltage which is actually less than the intended operating voltage of the capacitor.

Additional objects and features of the present invention will become apparent from the following detailed description of the invention when taken in connection with the accompanying drawing in which Figs. 1 to 6 illustrate the improved characteristics of filmed electrodes prepared in accordance with the present invention.

It is well known that the dielectric characteristics of a capacitor will change with increased temperature. For example, the energy losses will ordinarily increase with increased temperature, and this fact is one of the most prominent in determining the choice of a dielectric for capacitors for the purpose of meeting any given set of requirements or working conditions, e. g., working or service voltage. Practical capacitor dielectrics are not perfect insulators to electricity. One measure of the value of a capacitor is a measure of the current which leaks through the capacitor. The smaller the leakage current, the better the capacitor. For alternating current applications, the losses within the capacitor which include leakage current and other losses are usually lumped into one factor and expressed in terms of power factor. Power factor may generally be defined as the ratio of energy losses in the capacitor to the volt-amperes supplied to the capacitor. The power factor of the capacitor is usually expressed as a percentage figure with the ideal (loss free) capacitor having a zero power factor.

It is also well known that the operating and shelf life or aging characteristics of an electrolytic capacitor are largely dependent upon the type of oxide film or layer formed upon one or both of the electrodes. Since it is the property of this oxide film of permitting current to flow in one direction while retarding the flow in the opposite direction which determines the characteristics of the condenser, numerous processes have been used or suggested for the purpose of providing oxide films having the desired properties. The various processes have included the electrolyzing of the electrode as the anode in aqueous or non-aqueous solutions of different acids or bases. Multiple-step forming treatments have also been employed. For example, the electrodes have first been formed anodically in an aqueous solution of a suitable electrolyte followed by a second forming step in a non-aqueous or substantially non-aqueous electrolyte such as a solution of sodium carbonate in glycerine. It was believed by prior investigators that this double forming treatment in which the second electrolyte was non-aqueous would result in filmed electrodes which were more permanent in that they would not require reforming after long periods of idleness.

The present invention, which can be carried out in either one or two steps, is based on our discovery that superior dielectric films can be formed on a film-forming electrode, such as a tantalum foil electrode, by a method which essentially involves the use of a particular non-aqueous forming electrolyte operated at a relatively high temperature in excess of 150° C. and preferably about 200° C. at a voltage which may be less than the intended operating voltage of the capacitor.

In one form the process of the present invention comprises a preliminary forming step at a temperature of about 100° C. or slightly below this temperature, for example, from 85° to 100° C., in a substantially non-aqueous electrolyte composed of a solution of ammonium borate in a glycol, such as ethylene glycol, and a small amount of water. After the film has been formed to the desired extent in this forming electrolyte, the filming metal is transferred to a non-aqueous electrolyte and there formed at a more elevated temperature and preferably at a temperature of about 200° C. This second electrolyte hereinafter referred to as the residue electrolyte is a high boiling electrolyte obtained by heating a mixture of ammonium borate, ethylene glycol and at least one ethanolamine to a temperature of at least 150° C. and preferably to a temperature of about 250° C. or more. To obtain the optimum results, it has been found that the composition of the second electrolyte is quite critical.

When a two-step process is used, the electrolyte used in the first step preferably comprises a solution of ammonium borate in a mixture of ethylene glycol or diethylene glycol and water of such a composition that the water content of the solution is from about 5 to 15 per cent, generally about 5 per cent, by weight, and the ammonium borate content from 10 to 25 per cent and preferably in the neighborhood of about 10 per cent. This electrolyte, which may be termed substantially non-aqueous in view of the relatively small content of water, is employed at a temperature in the neighborhood of 100° C. The electrode material, for example, a tantalum foil, is made the anode in this electrolyte and formed at a suitable voltage. This forming treatment is continued until the leakage current is substantially zero.

The filmed product as removed from this forming bath is comparable to the formed electrodes presently employed in many electrolytic capacitors. While it is satisfactory for most capacitor applications, particularly at room or normal temperatures, the electrodes are not satisfactory for more elevated temperature applications.

The principal forming step which is the second step in the two-step process is essential and has been found to improve and stabilize the leakage current, power factor and other essential characteristics of the formed electrode, particularly at higher temperatures. This step, which produces a dielectric of improved high temperature capacity characteristics, comprises the use of the high boiling residue remaining after a mixture of glycol, such as ethylene glycol, and an ethanolamine, such as triethanolamine, and ammonium borate is heated to a temperature of at least 150° C. and preferably up to about 250° C. under conditions such that all of the components vaporizable below this temperature are removed from the bath. In this bath the electrodes are further anodically formed at a suitable voltage, which may be greater or less than the intended operating voltage for the electrodes, and at a temperature of from 150° to 250° C. A D.-C. forming voltage is employed and the forming operation is continued until the leakage current is substantially zero.

Improved results obtainable by the process of this invention will become more apparent from the consideration of the test results set forth in the accompanying drawing. In the various figures of the drawing there are plotted the results of 5000 hour tests (hereinafter referred to as "life tests") on tantalum foil electrolytic capacitors essentially differing only by the fact that the electrodes of one group of capacitors were formed only in the first forming electrolyte at a temperature of about 100° C. while the electrodes of the second group of capacitors were formed by employing the two-step process including not only the 100° C. step, which is comparable to many prior art processes, but also the second forming step at 200° C. in the residue electrolyte. In each of the figures, the curves marked "A" are plots of test results on the capacitors containing the electrodes formed only at the 100° C. temperature while curves "B" are the results of tests on capacitors containing electrodes which had been additionally formed in the high boiling electrolyte of the present invention.

The 100° C. forming step employed in these tests included the use of a solution consisting, by weight, of about 10 per cent ammonium borate, 5 per cent water and 42½ per cent ethylene glycol and 42½% diethylene glycol. Tantalum foils were immersed in this solution and anodically formed at 200 volts D.-C. until the leakage current was substantially zero. Microfarad capacitors made up from these foils were impregnated with an electrolyte consisting essentially of ammonium borate dissolved in a mixture of ethylene glycol and water and subjected to life tests at a temperature of 85° C. The second forming step given the electrodes of capacitors B comprised a 200° C. formation at 200 volts D.-C. in the residue obtained by heating a mixture of triethanolamine, ethylene glycol and ammonium borate to a temperature of 250° C. for the purpose of effecting reaction between the ingredients and removing all of the components of the reaction mixture boiling below this temperature.

In carrying out these tests, all of the capacitors were subjected to 150 volts D.-C. at 85° C. and the changes in capacity, per cent power factor and leakage current characteristics of the capacitors with time were measured at both 25° C. (room temperature) and at the 85° C. temperature. The results of the measurements to determine the stability of the capacitors which had been subjected to heating at 85° C., in so far as their capacity as measured at 25° C. is concerned, are plotted in Figs. 1 and 2. In Fig. 1 the test results are those of capacitors or condensers which have been tested at 60 C. P. S. (cycles per second) while those in Fig. 2 have been tested at 1000 C. P. S. It will be noted that as to both tests, the capacitors A in which the electrodes have been formed only by the 100° C. forming process showed a continued decrease in capacity with time. This decrease was marked and in each instance after a period of 5000 hours was such that the capacitors A had only 30 per cent of their initial capacity. Similar results (not plotted) were obtained with capacitors tested at the 85° C. temperature at each frequency.

In Figs. 3 to 6, inclusive, are plotted results of power factor tests on the same two types of capacitors which were given 150 volt D.-C. life tests at 85° C. The test results of Figs. 3 and 4 were measured at 25° C. and respectively at 60 C. P. S. and 1000 C. P. S. It will be noted that the per cent power factor increases quite rapidly in both the 60 C. P. S. and 1000 C. P. S. tests where the foils were formed only at the 100° C. temperature (curves A) whereas no substantial change was noted in the per cent power factor characteristics of the double formed foils (curves B) even after 5000 hour tests.

Figure 5:
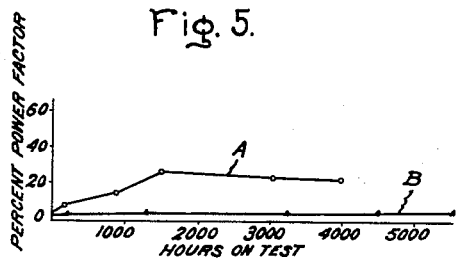
Figure 6:
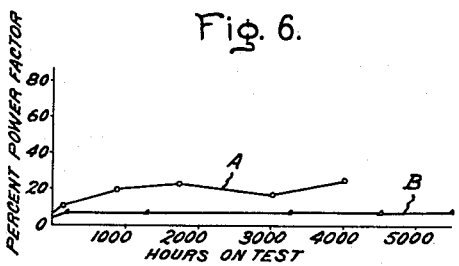

In Figs. 5 and 6, the plotted results are of power factor measurements at 85° C. on the same two types of capacitors. Here again it will be noted that both the 60 C. P. S. (Fig. 5) and the 1000 C. P. S. (Fig. 6) power factors of the capacitors containing electrodes formed at 200° C. in the residue electrolyte are much superior to those formed only at the 100° C. temperature.

The leakage currents of all of the capacitors tested at 25° C. after life tests at 85° C. were also measured. In all cases the results were less than 1 microampere at 5000 hours. However, in all cases the 200° C. formed capacitors had the lowest D.-C. leakage currents.

As is evident from the low leakage current characteristics, capacity stability and low stable power factors, the capacitors comprising tantalum electrodes formed in accordance with the present invention have outstandingly good properties particularly for a capacitor held for the indicated time at a life test temperature of 85° C. These results can be obtained to a substantial degree by using the residue remaining after fractional distillation of any suitable mixture of an ethanolamine, a glycol and ammonium borate in the preparation of the high temperature forming electrolyte. However, best results are obtained when the ethanolamine is triethanolamine.

One method of making the residue electrolyte comprises mixing about 12 per cent, by weight, ammonium borate, 58 per cent ethylene glycol and 30 per cent triethanolamine, heating the mixture until all of the ammonium borate has become dissolved in the glycol and triethanolamine and thereafter subjecting the mixture to distillation until 60 per cent, by weight, of the mixture has been removed by evaporation. The final temperature of the residue is about 250° C. The remaining 40 per cent is believed to consist primarily of a "triethanolamine borate," a small amount of a "glycol borate" and some free or combined ammonia. This product is a solid at room temperature and has a melting point of about 150° C. It can be employed at any temperature above its melting point and preferably at a temperature of at least 200° C. for the forming step described hereinbefore.

The proportions of ingredients employed do not appear to be particularly critical. For example, a useful residue electrolyte can be obtained with much less ethylene glycol in the original mixture. Likewise, other ethanolamines can be substituted for the triethanolamine. For example, good results can be obtained employing a mixture of ethanolamine and diethanolamine. Likewise, mixtures of triethanolamine and ethanolamine can be employed.

In accordance with another modification of the present invention, it has been found that the first or preliminary forming step can be omitted and the dielectric film formed entirely in the above-described residue electrolyte at an elevated temperature of at least 150° C. As is also the case with each of the steps in the two-step process, the forming voltage in the one-step process may be equal to or less than the working voltage. In fact, the forming voltage can advantageously be kept below the intended working voltage and the bath held at a maximum temperature to obtain an increased capacitance per sq. in. electrode area.

In accordance with the usual prior practices, the forming voltages have ordinarily been somewhat in excess of the intended working voltage for the capacitors. For example, if the expected service voltage was 50 volts D.-C., a forming voltage of approximately 75 volts D.-C. was employed. On the other hand, if the working voltage was 225 volts D.-C., it was believed desirable to employ a forming voltage of at least 300 volts D.-C.

We have discovered that, contrary to these prior practices, definite improvements can be obtained by forming the film at voltages which do not exceed the intended working voltage. For example, it has been found that a capacitor containing a tantalum foil formed at 125 volts D.-C. in the residue electrolyte at 200° C. when operated at 150 volts D.-C. will have a capacitance about 25 per cent higher than a capacitor containing a similar tantalum foil formed at 200 volts D.-C. and 100° C. in the usual forming electrolytes such as that described hereinbefore for use in the first or preliminary step of the two-step process.

Alternatively, the electrodes for a 150 volt D.-C. capacitor can be formed, for example, by preliminary forming at 200 volts D.-C. at 100° C. followed by a formation at 200° C. and 150 volts D.-C. in the residue electrolyte.

In addition to the further increase in initial capacity obtained by the lower voltage formation, the resultant capacitors also possess all of the desirable properties, including the stable capacity and power factor characteristics described hereinbefore.

In all cases the forming voltage should, of course, be so applied and raised to the desired point in such a manner that sparking or scintillation is avoided. It is in this regard that the use of triethanolamine in making the residue electrolyte is preferred. Scintillation at voltages much above 190 volts cannot be avoided with ethanolamine or diethanolamine. The use of triethanolamine permits the application of 350 volts before scintillation in those cases where the capacitor is intended for high voltage applications. By lowering the glycol-triethanolamine ratio, the permissible voltage formation can be raised even higher in the 200° C. formation.

What we claim as new and desire to secure by Letters Patent of the United States is:

1. The method of forming a dielectric film on a tantalum capacitor electrode which comprises subjecting said electrode to a forming voltage while said electrode is immersed in a hot forming bath consisting of the residue obtained by heating a mixture of an ethanolamine, ethylene glycol and ammonium borate at a temperature of at least 150° C. until all of the components of the heated mixture vaporizable below this temperature are removed, said bath being held at a temperature above the melting point of said residue.

2. The method of claim 1 in which the forming temperature is approximately 200° C.

3. The method of forming a dielectric film on a tantalum electrode which comprises first subjecting the electrode to a forming voltage at a temperature from 85 to 100° C. in a forming electrolyte comprising a mixture of ammonium borate, a glycol and a small amount of water, and thereafter subjecting said electrode to a forming voltage at a temperature of 150° C. to 250° C. while immersed in a bath consisting of the residue obtained by heating a mixture of an ethanolamine, ethylene glycol and ammonium borate to a temperature of at least 150° C. until all of the components of the heated mixture vaporizable below this temperature have been removed.

4. The method of claim 3 in which the ethanolamine is triethanolamine.

5. The method of forming a dielectric film on a tantalum capacitor electrode which comprises subjecting said electrode to a forming voltage at a temperature of about 150° C. to 250° C. while said electrode is immersed in a bath consisting of the residue obtained by heating a mixture of an ethanolamine, ethylene glycol and ammonium borate to a temperature of at least 150° C. until all of the components of the heated mixture vaporizable below 150° C. are removed.

6. The method of claim 5 in which the forming temperature is approximately 200° C. and the ethanolamine is triethanolamine.

References Cited in the file of this patent

UNITED STATES PATENTS

| 1,963,049 | Georgiev | June 12, 1934 |
| 1,973,602 | Bergstein | Sept. 11, 1934 |
| 2,052,575 | Lilienfeld | Sept. 1, 1936 |

FOREIGN PATENTS

| 439,788 | Great Britain | Dec. 13, 1935 |